Oct. 15, 1935.   C. F. NORTON   2,017,255
ELECTRIC MOTOR
Filed Nov. 23, 1933
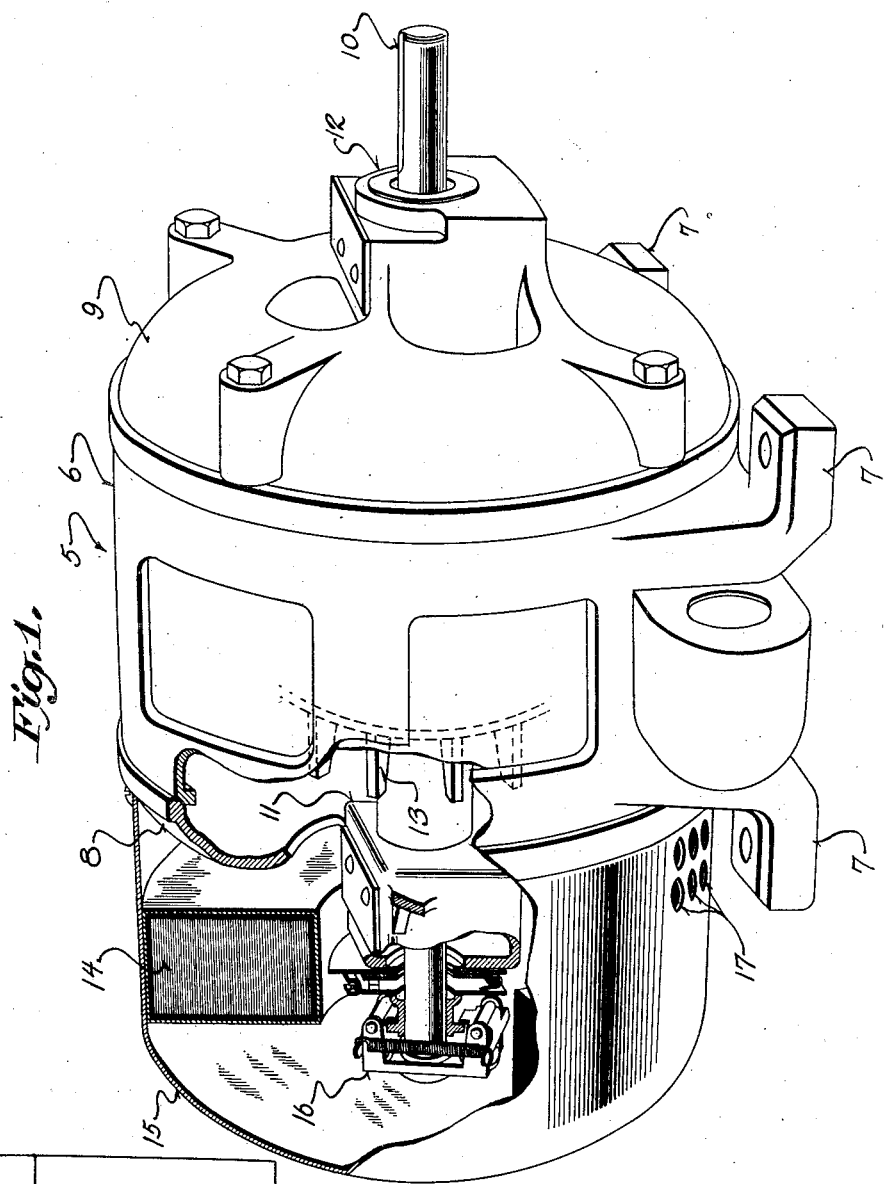
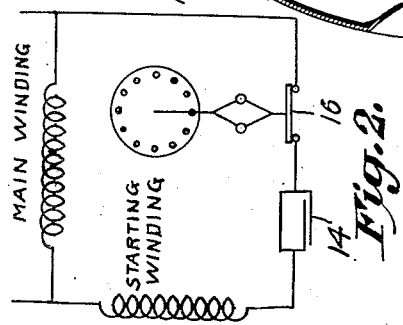
Inventor
Charles F. Norton Patented Oct. 15, 1935

2,017,255

UNITED STATES PATENT OFFICE 2,017,255

ELECTRIC MOTOR

Charles F. Norton, West Bend, Wis., assignor to The Louis Allis Company, Milwaukee, Wis., a corporation of Wisconsin Application November 23, 1933, Serial No. 699,311

8 Claims. (Cl. 172—279)

This invention relates to electric motors and refers more particularly to single phase motors of the capacitator start type.

Motors of this type, as is well known, are provided with auxiliary inducing or starting windings displaced in magnetic position from the main winding and connected to the line through a condenser or capacitor and a switch usually centrifugally opened to cut the capacitor and starting winding out of circuit after the motor has been brought up to speed.

Heretofore, the capacitor has been an entirely separate unit requiring space in addition to that needed for the motor and generally entailing an independent mounting. With this arrangement, it was also difficult to prevent overheating and consequent damage to the capacitor.

With these and other objections to past practice concerning the construction and connection of electric motors in mind, this invention has as an object to provide a novel and improved capacitor construction and a novel manner of mounting it on the motor.

More specifically, it is an object of this invention to construct the capacitor as a ring and to mount the same in a circular shell secured over one of the end bells of the motor in such a manner that practically no change in appearance and overall dimensions of the motor is required.

It is also an object of this invention to mount the capacitor on the motor in such a manner that the flow of ventilating air into the motor is utilized to keep the capacitor cool.

With the above and other objects in view which will appear as the description proceeds, my invention resides in the novel construction, combination and arrangement of parts substantially as hereinafter described and more particularly defined by the appended claims, it being understood that such changes in the precise embodiment of the herein-disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a perspective view of a motor with parts broken away and in section and illustrating the application of this invention thereto; and Figure 2 is a diagrammatic view of the motor.

Referring now more particularly to the accompanying drawing, the numeral 5 designates a single phase motor of the capacitor start type. The motor has the usual stator and rotor mounted in the housing 6 provided with supporting feet 7 and closed at its opposite ends by end bells 8 and 9. The rotor shaft 10 is journalled in bearings 11 and 12, carried respectively by the end bells 8 and 9, and has one end projecting from the bearing 12 to provide a drive shaft.

Air circulating means in the form of one or more fans 13 mounted on the rotor shaft 10 induces a current of ventilating air through the motor in the customary manner, the inlet for the ventilating air being at the end bell 8 and the outlet at the end bell 9.

The capacitor 14 with which the present invention is particularly concerned, is in the form of a ring and is mounted on the exterior of the end bell 8 by a cylindrical casing 15 attached to the end bell in any suitable manner and forming substantially a continuation of the motor housing 6. The capacitor is secured in the casing 15 in any suitable manner and being carried entirely by the casing becomes attached to the motor merely by the application of the casing 15 thereto.

The end of the rotor shaft 10 projecting from the bearing 11, extends into the casing 15 through the hollow center of the capacitor and mounts a centrifugal switch 16. The switch 16 may be of any suitable construction and as is customary, is adapted to open the starting circuit in which the capacitor is included when the motor attains a predetermined running speed. This manner of mounting the centrifugal switch insures maximum compactness, but, as will be readily apparent, is not essential to the attainment of the purposes of the invention.

At the lower portion of the casing 15 there are air holes 17 through which the ventilating air is drawn into the motor. The disposition of the air inlet openings at this point directs the current of ventilating cooling air upwardly around the capacitor and into the motor interior through the end bell 8. The incoming air thus effectually cools the capacitor as it quickly carries off any heat developed by the capacitor and also insulates the capacitor from the heat developed by the motor.

The specific internal construction of the capacitor forms no part of this invention and may be of any accepted and suitable design. Likewise, the specific manner of electrically connecting the capacitor and the switch with the windings of the motor forms no part of the invention and is, therefore, not shown.

From the foregoing description taken in connection with the accompanying drawing it will be readily apparent to those skilled in the art, that this invention provides a capacitor of novel construction and a novel manner of mounting the same on a motor so as to insure maximum compactness and greater life and efficiency for the capacitor.

What I claim as my invention is:

1. In combination with an electric motor of the capacitor start type having a housing with an end bell apertured to afford an air inlet to the motor interior and said motor having a starting winding and requiring a capacitor in circuit with the starting winding, a ring-like capacitor, and a casing for the capacitor mounted on said end bell of the motor over said air inlet to mount the capacitor on the exterior of said end bell in substantial coaxiality with the motor axis in the path of an air current entering the motor interior through said inlet.

2. In combination with an electric motor having an enclosing housing provided with an air inlet and means to draw a current of ventilating air into the motor interior through said inlet, a capacitor for the motor, and common means to mount the capacitor on the exterior of the motor housing adjacent said air inlet and to direct the current of ventilating air over the capacitor and into the air inlet.

3. In combination with an electric motor having an enclosing housing provided with an end bell and means to draw ventilating air through an opening in said end bell into the interior of the motor, a capacitor for the motor, and a casing for the capacitor attached to the end bell and covering the opening therein, said casing having an air inlet opening to permit the entrance of air into the casing for passage through the end bell opening into the motor interior, the opening in the casing being so located with respect to the capacitor as to direct the current of air flowing therethrough over the capacitor.

4. In combination with an electric motor having an enclosing housing including an end bell and means to create a current of ventilating air into the motor housing through an opening in said end bell, a ring-shaped capacitor for the motor, a cylindrical casing for the capacitor having one end closed and its open end secured to the end bell to be closed thereby and to afford a complete closure covering the opening in the end bell, and said casing having an air inlet opening to permit the entrance of air into the casing for passage through the end bell opening into the motor interior, said opening in the casing being so located as to cause the inflowing air to pass over the capacitor.

5. In combination with an electric motor of the capacitor start type having a starting winding and necessitating a capacitor in circuit with the starting winding, a substantially ring-shaped capacitor for the motor mounted on the exterior of an end wall of the motor, and a centrifugal switch to cut the starting winding and capacitor in and out of circuit disposed within the hollow of the ring-shaped capacitor.

6. In combination with an electric motor of the capacitor start type having a starting winding necessitating a capacitor in circuit with the starting winding, a ring-shaped capacitor, means to mount the capacitor on the exterior of the motor coaxially with the axis of the motor, a centrifugal switch to cut the capacitor and starting winding into and out of circuit disposed within the hollow of the ring-shaped capacitor, and means to draw ventilating air past the capacitor and into the motor interior to cool the capacitor and motor.

7. In combination with an electric motor having a stator and a rotor within an enclosing housing having air openings in one wall thereof, a capacitor for the motor, a cup-shaped casing for the capacitor secured to said wall of the housing to cover the opening therein, said casing having an air inlet opening, and means on the rotor to draw air through said inlet opening in the casing past the capacitor and through the opening in said housing wall into the motor interior.

8. In combination with an electric motor of the capacitor start type having a housing with an end bell apertured to afford an air inlet to the motor interior and having a starting winding and requiring a capacitor in circuit with the starting winding, a ring-like capacitor, and a casing for the capacitor mounted on said end bell over said air inlet to completely cover the same, said casing having an air inlet opening so located that air flowing through the casing for passage through the air inlet in the end bell flows over the capacitor to cool the same.

CHARLES F. NORTON.